(12) United States Patent
Hayakawa et al.

(10) Patent No.: US 9,919,662 B2
(45) Date of Patent: Mar. 20, 2018

(54) CABLE AND WIRE HARNESS

(71) Applicant: Hitachi Metals, Ltd., Tokyo (JP)

(72) Inventors: Yoshikazu Hayakawa, Hitachi (JP); Tomoyuki Murayama, Hitachi (JP); Hirotaka Eshima, Hitachi (JP); Fumihito Oka, Hitachi (JP); Takahiro Futatsumori, Mito (JP)

(73) Assignee: HITACHI METALS, LTD., Tokyo (JP)

( * ) Notice: Subject to any disclaimer, the term of this patent is extended or adjusted under 35 U.S.C. 154(b) by 0 days.

(21) Appl. No.: 15/432,218

(22) Filed: Feb. 14, 2017

(65) Prior Publication Data
US 2017/0253198 A1 Sep. 7, 2017

(30) Foreign Application Priority Data

Mar. 4, 2016 (JP) .................................. 2016-042304

(51) Int. Cl.
*H01B 7/00* (2006.01)
*B60R 16/02* (2006.01)
*H01B 11/02* (2006.01)

(52) U.S. Cl.
CPC ....... *B60R 16/0215* (2013.01); *H01B 7/0045* (2013.01); *H01B 11/02* (2013.01)

(58) Field of Classification Search
CPC .. H01B 7/0045; H01B 7/0216; H01B 7/0241; H01B 11/02; H01B 7/2825; B60R 16/0215; B60R 16/0207; B60T 1/065; B60T 13/74

USPC ........ 174/70 C, 70 R, 135, 72 A, 73.1, 74 R, 174/96, 137 R, 138 R, 68.1, 68.3; 248/68.1, 49
See application file for complete search history.

(56) References Cited

U.S. PATENT DOCUMENTS

| | | | | |
|---|---|---|---|---|
| 4,150,249 A | * | 4/1979 | Pedersen | H01B 3/441 174/103 |
| 4,151,366 A | * | 4/1979 | Betts | H01B 7/295 174/110 B |
| 4,595,793 A | * | 6/1986 | Arroyo | G02B 6/4436 174/121 A |
| 4,687,294 A | * | 8/1987 | Angeles | G02B 6/443 174/121 A |
| 4,781,433 A | * | 11/1988 | Arroyo | G02B 6/4403 264/1.28 |
| 5,310,964 A | * | 5/1994 | Roberts | G02B 6/4416 174/105 SC |
| 5,343,549 A | * | 8/1994 | Nave | G02B 6/4436 385/103 |
| 6,747,214 B2 | * | 6/2004 | Goeblmaier | H01B 7/0258 174/110 R |
| 7,247,797 B2 | * | 7/2007 | Buthe | H01B 7/295 174/110 R |

(Continued)

FOREIGN PATENT DOCUMENTS

JP 2014-135153 A 7/2014

*Primary Examiner* — Angel R Estrada
(74) *Attorney, Agent, or Firm* — Roberts Mlotkowski Safran Cole & Calderon P.C.

(57) ABSTRACT

A cable includes a plurality of electric wires, a paper tape wound around the plurality of electric wires, and an outer covering that covers a periphery of the paper tape and comprises a urethane-based resin. An air resistance of the paper tape as measured by Gurley tester method is not less than 5.0 sec/100 cc.

18 Claims, 3 Drawing Sheets

(56) References Cited

U.S. PATENT DOCUMENTS

| | | | | |
|---|---|---|---|---|
| 7,534,962 B2* | 5/2009 | Scheel | ................... | H01B 3/427 |
| | | | | 174/110 R |
| 7,964,797 B2* | 6/2011 | Clark | ..................... | H01B 7/184 |
| | | | | 174/110 R |
| 8,455,080 B2* | 6/2013 | Baer | ........................ | B32B 5/26 |
| | | | | 428/189 |
| 8,530,745 B2* | 9/2013 | Eshima | ................. | H01B 7/228 |
| | | | | 174/108 |
| 2014/0190741 A1 | 7/2014 | Hayakawa | | |

* cited by examiner

CABLE AND WIRE HARNESS

The present application is based on Japanese patent application No. 2016-042304 filed on Mar. 4, 2016, the entire contents of which are incorporated herein by reference.

BACKGROUND OF THE INVENTION

1. Field of the Invention

The invention relates to a cable and a wire harness and, in particular, to a cable and a wire harness which are used in a vehicle such as automobile for connection between a wheel side and a vehicle body side.

2. Description of the Related Art

In recent years, electrically operated brake units are used in vehicles such as automobiles.

Electro-mechanical brakes (EMB) and electric parking brakes (EPB) are known as such electrically operated brake units.

The electro-mechanical brakes, also simply called electric friction brake or electric brake, are configured such that a rotational drive force of a dedicated electric motor mounted on each wheel of a vehicle is controlled according to the operation amount (tread force or displacement amount) of a brake pedal by a driver, so that a piston driven by the electric motor presses brake pads against a disc rotor of the wheel to generate a braking force intended by the driver.

The electric parking brakes are configured such that a dedicated electric motor provided on each wheel of a vehicle is driven based on an operation performed on a parking brake activation switch by a driver after stopping a vehicle, so that a piston driven by the electric motor presses brake pads against a disc rotor of the wheel to generate a braking force.

Meanwhile, in recent years, sensors, e.g., ABS (Anti-Lock Brake System) sensor for detecting the speed of a wheel rotation during motion, air pressure sensor for detecting air pressure of a tire and temperature sensor, etc., are often mounted on wheels of vehicles.

Accordingly, the wheel side and the vehicle body side are connected through cables in which a signal line for a sensor mounted on a wheel and/or a signal line for controlling an electro-mechanical brake and a power line for supplying power to an electric motor of electro-mechanical brake or electric parking brake are housed in one sheath. The cables with connectors integrally provided at end portions are called wire harness.

JP-A-2014-135153 discloses a cable in which talc powder is interposed between plural electric wires and a sheath covering all the plural electric wires together such that friction between the electric wires and the sheath is reduced to reduce stress applied to the electric wires when being bent and a flex resistance is thereby improved.

SUMMARY OF THE INVENTION

The cable disclosed by JP-A-2014-135153 has a problem that if a large amount of the talc powder is used, the talc powder may be scattered in a working environment so that the working environment deteriorates.

It is an object of the invention to provide a cable and a wire harness that prevent the deterioration of the working environment while securing the flex resistance.

According to an embodiment of the invention, a cable comprises:
a plurality of electric wires;
a paper tape wound around the plurality of electric wires; and
an outer covering that covers a periphery of the paper tape and comprises a urethane-based resin,
wherein an air resistance of the paper tape as measured by Gurley tester method is not less than 5.0 sec/100 cc.

According to another embodiment of the invention, a wire harness comprises:
the cable mentioned above; and
a connector attached to at least one of end portions of the first electric wires and of the second electric wires.

Effects of the Invention

According to an embodiment of the invention, a cable and a wire harness can be provided that prevent the deterioration of the working environment while securing the flex resistance.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Embodiment

An embodiment of the invention will be described below in conjunction with the appended drawings.

Description of Vehicle in which Cable is Used

Figure 1:
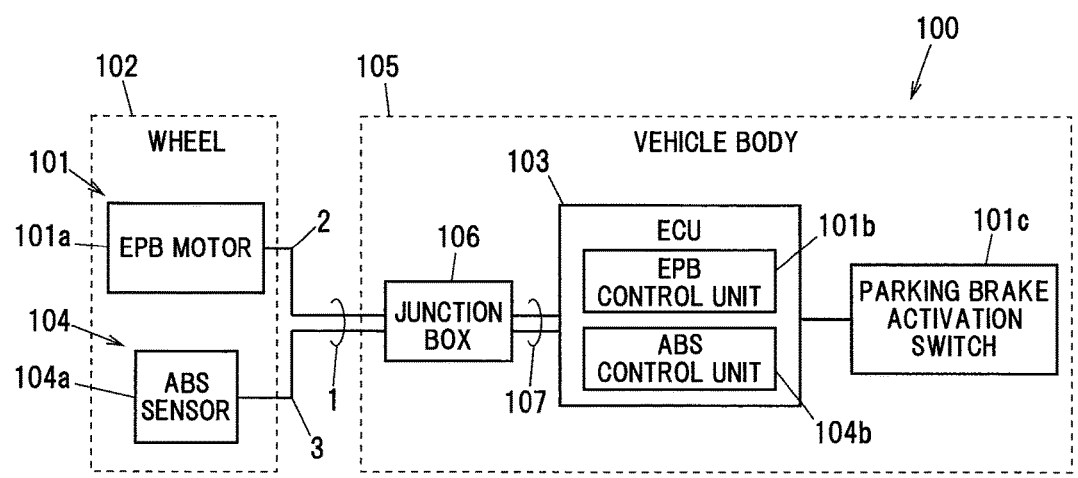
FIG. 1 is a block diagram illustrating a configuration of a vehicle in which a cable in an embodiment of the present invention is used.

FIG. 1 is a block diagram illustrating a configuration of a vehicle in which a cable in the present embodiment is used.

As shown in FIG. 1, a vehicle 100 is provided with an electric parking brake (hereinafter, referred to as "EPB") 101 as an electrically operated brake unit.

The EPB 101 is provided with an EPB motor 101a and an EPB control unit 101b.

The EPB motor 101a is mounted on a wheel 102 of the vehicle 100. The EPB control unit 101b is mounted on an ECU (electronic control unit) 103 of the vehicle 100. Alternatively, the control unit 101b may be mounted on a control unit other than the ECU 103, or may be mounted on a dedicated hardware unit.

The EPB motor 101a is provided with a piston to which brake pads are attached even though it is not illustrated, and it is configured such that the piston moved by rotary drive of the EPB motor 101a presses the brake pads against a disc rotor of a wheel (the wheel 102) to generate a braking force. A pair of first electric wires 2 as power lines is connected to the EPB motor 101a to supply a drive current to the EPB motor 101a.

The EPB control unit 101b is configured to output a drive current to the EPB motor 101a for a predetermined period of time (e.g., for 1 second) when a parking brake activation switch 101c is turned from an OFF state to an ON state during the stationary state of the vehicle 100 such that the brake pads are pressed against the disc rotor of the wheel 102 and a braking force to be applied to the wheel 102 is generated. The EPB control unit 101b is also configured to output a drive current to the EPB motor 101a when the parking brake activation switch 101c is turned from the ON state to the OFF state or when an accelerator pedal is depressed such that the brake pads move away from the disc rotor of the wheel and the braking force on the wheel 102 is released. In other words, it is configured such that an operating state of the EPB 101 is maintained from when the parking brake activation switch 101c is turned on to when the parking brake activation switch 101c is turned off or the accelerator pedal is depressed. The parking brake activation switch 101c may be a switch of either a lever-type or pedal-type.

An ABS device 104 is also mounted on the vehicle 100. The ABS device 104 is provided with an ABS sensor 104a and an ABS control unit 104b.

The ABS sensor 104a is mounted on the wheel 102 to detect a rotation speed of the wheel 102 during motion of the vehicle. The ABS control unit 104b is mounted on the ECU 103 to control a brake unit based on an output of the ABS sensor 104a to adjust a braking force applied to the wheel 102 such that the wheel 102 is not locked when suddenly stopped. A pair of second electric wires 3 as signal lines is connected to the ABS sensor 104a.

Figure 2A:
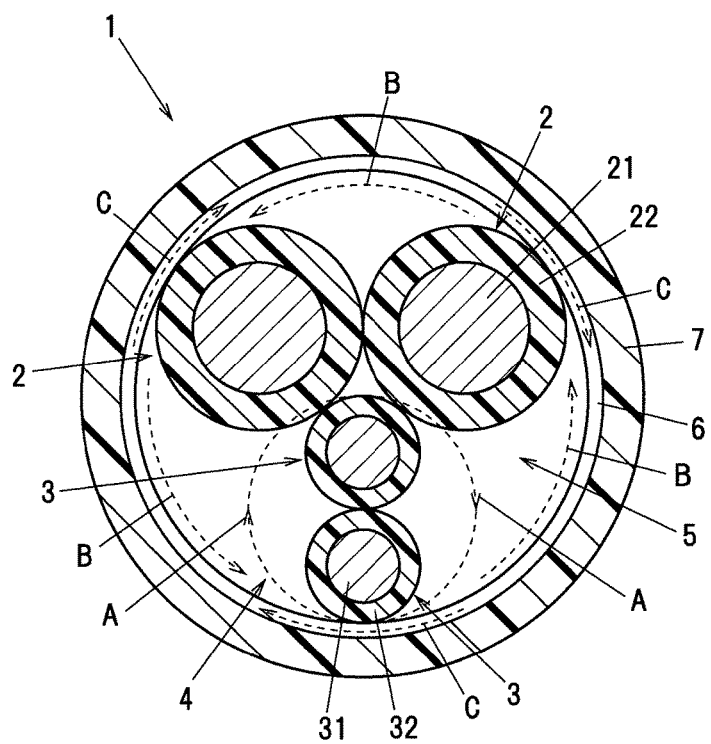
FIG. 2A is a cross sectional view showing the cable in the embodiment of the invention.
Figure 2B:
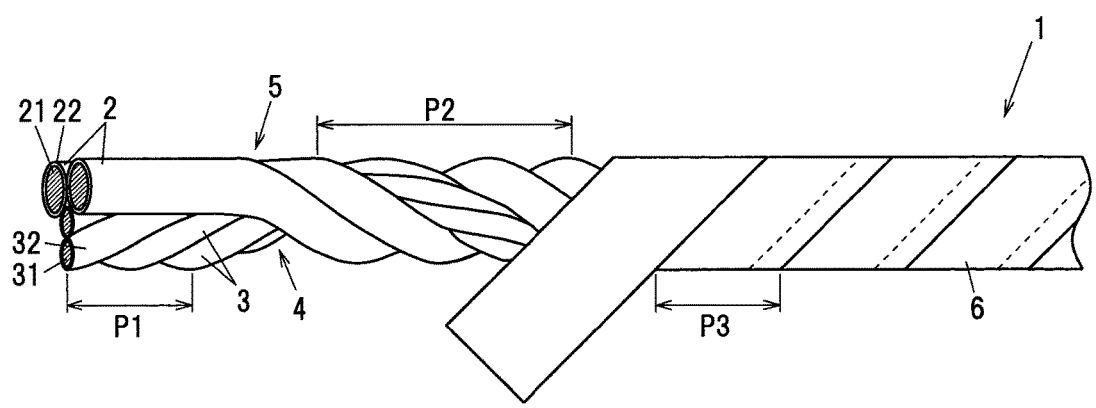
FIG. 2B is an explanatory diagram illustrating twist directions of first electric wires and second electric wires and a winding direction of a paper tape in the cable shown in FIG. 2A.

A cable 1 in the present embodiment is obtained by covering the first electric wires 2 and the second electric wires 3 with one sheath 7 (see FIGS. 2A and 2B). The cable 1 extending out of the wheel 102 side is connected to a wire group 107 inside a junction box 106 provided on a vehicle body 105 and is then connected to the ECU 103 and a battery (not shown) via the wire group 107.

Although only one wheel 102 is shown in FIG. 1 to simplify the drawing, the EPB motor 101a and the ABS sensor 104a may be mounted on each of the wheels 102 of the vehicle 100, or may be mounted on, e.g., only front wheels or only rear wheels of the vehicle 100.

Description of the Cable 1

FIG. 2A is a cross sectional view showing the cable 1 in the present embodiment and FIG. 2B is an explanatory diagram illustrating twist directions of first electric wires and second electric wires and a winding direction of a paper tape 6.

As shown in FIGS. 2A and 2B, the cable 1 is provided with a pair of first electric wires 2, a twisted pair wire 4 formed by twisting a pair of second electric wires 3 having a smaller outer diameter than the first electric wires 2, a paper tape 6 spirally wound around an assembled article 5 which is formed by twisting the pair of first electric wires 2 and the twisted pair wire 4 together, and a sheath 7 as an outer covering which is formed of a urethane-based resin and provided to cover the periphery of the paper tape 6.

In the present embodiment, the first electric wire 2 is constructed using a power line for supplying a drive current to the motor 101a for the EPB 101 mounted on the wheel 102 of the vehicle 100. Meanwhile, the second electric wire 3 is constructed using a signal line for the ABS sensor 104a mounted on the wheel 102.

The first electric wire 2 is configured such that a first conductor 21 formed by twisting highly conductive strands of copper, etc., is covered with a first insulation 22 formed of an insulating resin such as cross-linked polyethylene.

Strands having a diameter of not less than 0.05 mm and not more than 0.30 mm can be used to form the first conductor 21. When using strands having a diameter of less than 0.05 mm, sufficient mechanical strength may not be obtained, causing a decrease in flex resistance. When using strands having a diameter of more than 0.30 mm, flexibility of the cable 1 may decrease.

The outer diameter of the first conductor 21 and the thickness of the insulation 22 of the first electric wire 2 are appropriately adjusted according to magnitude of required drive current. In the present embodiment, considering that the first electric wire 2 is a power line for supplying a drive current to the motor 101a for the EPB 101, the outer diameter of the first conductor 21 is set to not less than 1.5 mm and not more than 3.0 mm and the outer diameter of the first electric wire 2 is set to not less than 2.0 mm and not more than 4.0 mm.

The second electric wire 3 is configured such that a second conductor 31 formed by twisting highly conductive strands of copper, etc., is covered with a second insulation 32 formed of an insulating resin such as cross-linked polyethylene. Strands having a diameter of not less than 0.05 mm and not more than 0.30 mm can be used to form the second conductor 31, in the same manner as the first conductor 21.

The outer diameter of the second electric wire 3 is smaller than that of the first electric wire 2. In the present embodiment, the twisted pair wire 4 formed by twisting a pair (two) of second electric wires 3 is twisted with the pair of first electric wires 2. Therefore, from the viewpoint of making the outer diameter of the cable 1 close to a circular shape, it is desirable to use the second electric wire 3 which is about half the outer diameter of the first electric wire 2. In detail, it is possible to use the second electric wire 3 which has an outer diameter of not less than 1.0 mm and not more than 1.8 mm and is formed using the second conductor 31 having an outer diameter of not less than 0.4 mm and not more than 1.0 mm.

A twist pitch P1 of the twisted pair wire 4 is set by taking into account the outer diameter of the second electric wire 3 such that an unnecessary load is not applied to the second electric wires 3. The twist pitch P1 of the twisted pair wire 4 here is about 30 mm, but the twist pitch P1 of the twisted pair wire 4 is not limited thereto. The twist pitch P1 of the twisted pair wire 4 is a distance along a longitudinal direction of the twisted pair wire 4 at which a given second electric wire 3 is located at the same position in a circumferential direction of the twisted pair wire 4.

The assembled article 5 is formed by twisting the pair of first electric wires 2 and the twisted pair wire 4 together. In the present embodiment, the assembled article 5 is configured such that the pair of first electric wires 2 are in contact with each other, the pair of second electric wires 3 are in contact with each other and the pair of first electric wires 2 are further in contact with the second electric wires 3. In this configuration, the second electric wires 3 are at least partially arranged in a triangle boundary area between the pair of first electric wires 2.

Furthermore, in the present embodiment, the assembled article 5 is configured such that plural thread-shaped (fibrous) fillers (not shown) extending in the longitudinal direction of the cable 1 are arranged between the pair of first electric wires 2/the twisted pair wire 4 and the paper tape 6 and are twisted together with the first electric wires 2 and the twisted pair wire 4. Thus, the twist direction and twist pitch of the plural fillers are the same as those of the assembled article 5. The plural fillers are arranged to fill a gap between the pair of first electric wires 2/the twisted pair wire 4 and the paper tape 6, so that a cross sectional shape after winding the paper tape 6 around the assembled article 5 is closer to a circle.

Some of the plural fillers may be arranged in triangle boundary areas between the pair of first electric wires 2 and triangle boundary areas between the pair of second electric wires 3.

As the filler, it is possible to use a fibrous material such as polypropylene yarn, spun rayon yarn (rayon staple fiber), aramid fiber, nylon fiber or fiber plastic, a paper or a cotton yarn. In addition, the cross sectional area of the fillers on the cross section of FIG. 2 is preferably smaller than the cross sectional area of the first electric wires 2 and the cross sectional area of the second electric wires 3.

In the EPB 101, a drive current is supplied to the motor 101a basically when the vehicle is stationary. On the other hand, the ABS sensor 104a is used when the vehicle is in motion and, in normal use, the ABS sensor 104a is not used during when the drive current is supplied through the first electric wires 2. Therefore, in the present embodiment, a shield conductor around the twisted pair wire 4 is omitted. Omitting the shield conductor allows the cable 1 to have a smaller outer diameter than when providing the shield conductor and also reduces the number of components, thereby reducing the cost.

Although the first electric wire 2 for supplying a drive current to the EPB motor 101a is described here, the first electric wire 2 may be used to supply a drive current to, e.g., an electric motor of an electro-mechanical brake (hereinafter, referred to as EMB) provided on the wheel 102. In this case, since an electric current flows through the first electric wires 2 also during motion of the vehicle 100, it is desirable to provide a shield conductor around the twisted pair wire 4 to prevent malfunction of the ABS device 104 due to noise.

Meanwhile, although the second electric wire 3 as a signal line for the ABS sensor 104a is described here, the second electric wire 3 may be a signal line used for another sensor provided on the wheel 102, e.g., for a temperature sensor or an air pressure sensor for detecting air pressure of a tire, etc., or may be a damper wire used to control a damping device of the vehicle 100, or moreover, may be a signal line for controlling the EMB (a CAN cable, etc.). Even when the first electric wire 2 is used to supply a drive current to the EPB motor 101a, it is desirable to provide a shield conductor around the twisted pair wire 4 in case of using the second electric wires 3 during the stationary state of the vehicle 100 to prevent malfunction due to noise.

The outer diameter of the entire assembled article 5 is, e.g., about 5 mm to 9 mm. A twist pitch P2 of the assembled article 5 is set by taking into account the outer diameter of the assembled article 5 such that an unnecessary load is not applied to the first electric wires 2 and the twisted pair wire 4. The twist pitch P2 of the assembled article 5 here is about 60 mm, but the twist pitch P2 of the assembled article 5 is not limited thereto. The twist pitch P2 of the assembled article 5 is a distance along a longitudinal direction of the assembled article 5 at which a given first electric wire 2 or the twisted pair wire 4 is located at the same position in a circumferential direction of the assembled article 5.

The paper tape 6 is spirally wound around the assembled article 5, and the paper tape 6 in the present embodiment is in contact with all electric wires (the pair of first electric wires 2 and the twisted pair wire 4) constituting the assembled article 5. The paper tape 6 is interposed between the assembled article 5 and the sheath 7 and serves to reduce friction between the assembled article 5 (the electric wires 2 and 3) and the sheath 7 when being bent. In other words, providing the paper tape 6 can reduce friction between the electric wires 2, 3 and the sheath 7 without using a lubricant such as talc powder unlike the conventional technique, and thus reduces stress applied to the electric wires 2 and 3 when being bent, and it is thereby possible to improve flex resistance.

The paper tape 6 is desirably slidable (desirably has a low friction coefficient) with respect to the first insulation 22 of the first electric wire 2 and the second insulation 32 of the second electric wire 3. In more detail, a material of the paper tape 6 is selected such that the friction coefficient (coefficient of static friction) between the paper tape 6 and the insulations 22, 32 is lower than the friction coefficient (coefficient of static friction) between the sheath 7 and the insulations 22, 32 without interposition of the paper tape 6.

The paper tape 6 is formed by matting fibers of plants, etc., into a tape shape and contains cellulose or hemicellulose, etc., as components. In general, wood pulp is used to manufacture paper tape. The paper tape is advantageous in that it can be torn easier than nonwoven fabric and processability at the time of terminating the cable 1 is relatively high.

In the meantime, in trial production of the cable, the present inventors found a problem that when a urethane-based resin sheath is applied to the periphery of a paper tape, foaming of the sheath occurs and voids are thus formed in the sheath. As a result of intense study on this problem, the present inventors found that when a paper tape is wound around plural electric wires in a highly humid environment, the air containing moisture (water) is trapped in a space covered with the paper tape and the paper tape absorbs the water from the air trapped in such space. It was also found that when the urethane-based resin sheath is applied by extrusion coating to the periphery of the paper tape containing water, the water evaporates from the paper tape due to heat during when applying the sheath and foaming of the sheath occurs.

Then, the present inventors conceived to use the paper tape 6 having an air resistance of not more than 30.0 sec/100 cc as measured by the Gurley method (or Gurley tester method) in accordance with JIS P 8117:2009. By using such paper tape, the humid air trapped in the above-described space can be easily eliminated to the outside of the space and foaming of the sheath 7 can be thus reduced.

In addition, the air resistance of the paper tape 6 as measured by the Gurley method is desirably not less than 5.0 sec/100 cc. When using the paper tape 6 having a Gurley air resistance of larger than 30.0 sec/100 cc, strength of the paper tape 6 decreases and the paper tape 6 may be torn at the time of winding the paper tape 6 around the plural electric wires, resulting in a decrease in workability. In view of further reducing foaming of the sheath 7 as well as probability of a decrease in workability, the air resistance of the paper tape 6 as measured by the Gurley method is preferably not less than 6.0 sec/100 cc and not more than 20.0 sec/100 cc.

The paper tape 6 having an air resistance of 7.3 sec/100 cc is used in the present embodiment.

In the present embodiment, the paper tape 6 is spirally wound around the assembled article 5 so as to overlap at a portion in a width direction (a direction perpendicular to the longitudinal direction and thickness direction of the paper tape 6). The overlap width of the paper tape 6 is, e.g., not less than ¼ and not more than ½ of the width of the paper tape 6. Alternatively, the paper tape 6 may be longitudinally wrapped around the assembled article 5.

The width of the paper tape 6 is determined such that creases are not formed on the paper tape 6 when the paper tape 6 is wound, and it is desirable that the width of the paper tape 6 to be used be decreased with a decrease in the outer diameter of the entire assembled article 5. In detail, when the outer diameter of the assembled article 5 is 5 mm to 9 mm, the width of the paper tape 6 is about 20 mm to 50 mm. A winding pitch P3 of the paper tape 6, i.e., a distance along a longitudinal direction at which the paper tape 6 is located at the same circumferential position (e.g., a distance between the widthwise edges), depends on the width of the paper tape 6 and the overlap width (a winding angle of the paper tape 6) and is up to about 40 mm in this case. The winding pitch P3 of the paper tape 6 here is about 30 mm, but the winding pitch P3 of the paper tape 6 is not limited thereto.

When the paper tape 6 is spirally wound around the assembled article 5 and if the width of the paper tape 6 is increased and the winding pitch P3 is also increased, the paper tape 6 becomes close to the longitudinally wrapped state, resulting in that the cable 1 has less flexibility and is less likely to be bent. Therefore, the winding pitch P3 of the paper tape 6 is desirably not more than 40 mm. When the width of the paper tape 6 is reduced and the winding pitch P3 is also reduced, the number of turns increases and the cable 1 is likely to have a kink. However, in the present embodiment, a kink due to the paper tape 6 is used to straighten a kink due to twisting of the assembled article 5 (the details will be described later).

The sheath 7 as an outer covering is provided around the paper tape 6. The sheath 7 is formed of a urethane-based resin. Although a shield conductor around the paper tape 6 is omitted in the present embodiment since the first electric wires 2 are used to supply a drive current to the EPB motor 101a and the drive current flows through the first electric wires 2 in a relatively short time, a shield conductor may be provided between the paper tape 6 and the sheath 7 or around the sheath 7 depending on the intended use, etc., of the first electric wires 2.

Twist Directions of the Twisted Pair Wire 4 and the Assembled Article 5 and Winding Direction of the Paper Tape 6

The cable 1 of the present embodiment is configured such that the twist direction of the twisted pair wire 4 is different from the twist direction of the assembled article 5, and the twist direction of the assembled article 5 is different from the winding direction of the paper tape 6. In other words, in the cable 1, the twist direction of the twisted pair wire 4 and the winding direction of the paper tape 6 are the same direction and only the twist direction of the assembled article 5 is different.

The twist direction here is a direction that the electric wires 2 and 3 rotate from the base end toward the front end when the cable 1 is viewed from the front end side (the left side of FIG. 2B, on the side where the paper tape 6 overlaps upon itself). In this example, the twist direction of the twisted pair wire 4 is the right rotation (clockwise) and the twist direction of the assembled article 5 is the left rotation (counterclockwise). The twist direction of the twisted pair wire 4 is a direction of twisting two second electric wires 3 together, and the twist direction of the assembled article 5 is a direction of twisting two first electric wires 2 and the twisted pair wire 4 together.

Meanwhile, the winding direction of the paper tape 6 is a direction that the paper tape 6 rotates from the base end toward the front end when the cable 1 is viewed from the front end side (the left side of FIG. 2B, on the side where the paper tape 6 overlaps upon itself). In this example, the winding direction of the paper tape 6 is the right rotation (clockwise). The cross section as viewed from the front end side is shown in FIG. 2A in which the twist direction of the twisted pair wire 4 is indicated by a dashed arrow A, the twist direction of the assembled article 5 is indicated by a dashed arrow B and the winding direction of the paper tape 6 is indicated by a dashed arrow C.

In general, when twisting electric wires together or spirally winding a tape, a kink is formed according to the twist direction or the winding direction and the entire cable curves spontaneously. In the present embodiment, the twist direction of the twisted pair wire 4 is different from the twist direction of the assembled article 5 and also the twist direction of the assembled article 5 is different from the winding direction of the paper tape 6. Therefore, the kink of the twisted pair wire 4 and the kink of the assembled article 5 are in the opposite directions and thus cancel out each other, and also, the kink of the assembled article 5 and the kink caused by winding the paper tape 6 are in the opposite directions and thus cancel out each other, and it is thereby possible to easily realize a straight cable 1 which is prevented from kinking up. As a result, it is possible to reduce variation in bending properties in the longitudinal direction of the cable 1.

In case that the twist direction of the twisted pair wire 4 is the same as the twist direction of the assembled article 5, the twisted pair wire 4 may be distorted in a direction of tightening the twist when twisting the assembled article 5, causing a change in the twist pitch P1 of the twisted pair wire 4. Differing the twist direction of the twisted pair wire 4 from the twist direction of the assembled article 5 allows the assembled article 5 to be formed while suppressing a change in the twist pitch P1 of the twisted pair wire 4.

In this regard, however, if the twist pitch P1 of the twisted pair wire 4 is large, the twist of the twisted pair wire 4 may loosen when twisting the assembled article 5. Therefore, the twist pitch P1 of the twisted pair wire 4 is desirably smaller than at least the twist pitch P2 of the assembled article 5. In other words, when the twist direction of the twisted pair wire 4 is different from the twist direction of the assembled article 5, adjusting the twist pitch P1 of the twisted pair wire 4 to smaller than the twist pitch P2 of the assembled article 5 allows the twist of the twisted pair wire 4 to be less likely to unravel and it is thereby possible to stabilize the cross sectional shape of the assembled article 5.

In the present embodiment, since the kink caused by winding the paper tape 6 is used to straighten the kink of the assembled article 5, the winding pitch P3 of the paper tape 6 needs to be small enough to cause a kink. Therefore, the winding pitch P3 of the paper tape 6 is desirably smaller than at least the twist pitch P2 of the assembled article 5. In the present embodiment, the twist pitch P1 of the twisted pair wire 4 is about 30 mm, the twist pitch P2 of the assembled article 5 is about 60 mm and the winding pitch P3 of the paper tape 6 is about 30 mm.

Although the winding pitch P3 of the paper tape 6 is the same as the twist pitch P1 of the twisted pair wire 4 in the present embodiment, the winding pitch P3 of the paper tape 6 only needs to be not less than the twist pitch P1 of the twisted pair wire 4. In such a configuration, it is possible to reduce distortion of the paper tape 6 at a portion in contact with the twisted pair wire 4 and it is easy to form the cable 1 having a circular cross sectional shape. In addition, an effect of reducing a decrease in flex resistance of the twisted pair wire 4 can be obtained.

Likewise, since the twist direction of the assembled article 5 is different from the winding direction of the paper tape 6, the twist pitch P2 of the assembled article 5 is less likely to change when winding the paper tape 6 and it is thereby possible to stabilize the twist pitch P2 of the assembled article 5.

Furthermore, by differing the twist direction of the assembled article 5 from the winding direction of the paper tape 6, the paper tape 6 is prevented from entering a gap between the first electric wires 2 or between the first electric wire 2 and the twisted pair wire 4 and it is thereby possible to form the cable 1 having a cross sectional shape closer to a circle. This results in improving the outer appearance of the cable 1 and also allows the sheath 7 to be easily stripped and removed. Since the kink is reduced in the cable 1 as described above, the sheath 7 is stripped and removed more easily.

Furthermore, by differing the twist direction of the assembled article 5 from the winding direction of the paper tape 6, a direction likely to cause buckling of the assembled article 5 can be different from a direction likely to cause buckling of the paper tape 6. Therefore, it is possible to realize the cable 1 which is less likely to buckle even when, e.g., twist and bend are simultaneously applied to the cable 1.

Description of Wire Harness Using the Cable 1

Figure 3:
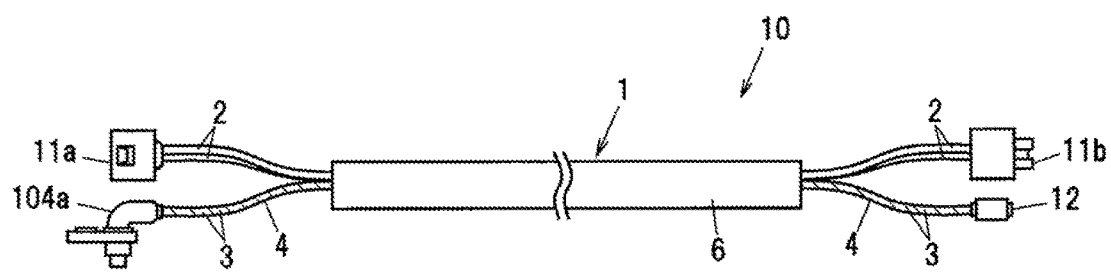
FIG. 3 is a schematic configuration diagram illustrating a wire harness in the embodiment of the invention.

FIG. 3 is a schematic configuration diagram illustrating a wire harness in the present embodiment.

As shown in FIG. 3, a wire harness 10 is composed of the cable 1 in the present embodiment and a connector attached to at least one of end portions of the first electric wires 2 and of the second electric wires 3.

In FIG. 3, an end portion on the wheel 102 side is shown on the left side and an end portion on the vehicle body 105 side (the junction box 106 side) is shown on the right side. In the following description, an end of the wire harness 10 on the wheel 102 side is referred to as "one end" and another end on the vehicle body 105 side (the junction box 106 side) is referred to as "other end".

A wheel-side power connector 11a for connection to the EPB motor 101a is attached to one end of the pair of first electric wires 2, and a vehicle body-side power connector 11b for connection to the wire group 107 inside the junction box 106 is attached to the other end of the pair of first electric wires 2.

The ABS sensor 104a is attached to one end of the pair of second electric wires 3 (the twisted pair wire 4), and a vehicle body-side ABS connector 12 for connection to the wire group 107 inside the junction box 106 is attached to the other end of the pair of second electric wires 3 (the twisted pair wire 4).

Although the separate connectors are provided on the first electric wires 2 and the second electric wires 3 (the twisted pair wire 4) in this example, one dedicated connector may be provided such that both electric wires 2 and 3 are connected all together.

Functions and Effects of the Embodiment

As described above, the cable 1 in the present embodiment is provided with the paper tape 6 spirally wound around the assembled article 5.

Providing the paper tape 6 can reduce friction between the electric wires 2, 3 and the sheath 7 without using a lubricant such as talc powder, and thus reduces stress applied to the electric wires 2 and 3 when being bent, and it is thereby possible to improve flex resistance. Since the paper tape 6 can be easily removed when terminating the cable, it is possible to improve cable termination workability while maintaining flex resistance.

In addition, the air resistance of the paper tape 6 as measured by the Gurley method is not more than 30.0 sec/100 cc. As a result, the (humid) air trapped in a space covered with the paper tape 6 can be easily eliminated to the outside of the space and it is thus possible to reduce moisture absorption of the paper tape 6 from the air trapped in the covered space. It is thereby possible to reduce foaming of the sheath 7.

In addition, by differing the twist direction of the twisted pair wire 4 from the twist direction of the assembled article 5 and also differing the twist direction of the assembled article 5 from the winding direction of the paper tape 6, the kink due to the twisting or the winding of the paper tape 6 can be reduced and it is also possible to stabilize the twist pitches P1 and P2 of the twisted pair wire 4 and the assembled article 5. As a result, it is possible to reduce variation in bending properties, and also, flexibility in the longitudinal direction is stabilized and it is thereby possible to realize the cable 1 which is easy to route. Furthermore, since it is possible to form the cable 1 having a cross sectional shape closer to a circle, it is easy to strip the sheath 7.

Summary of the Embodiments

Technical ideas understood from the embodiment will be described below citing the reference numerals, etc., used for the embodiment. However, each reference numeral, etc., described below is not intended to limit the constituent elements in the claims to the members, etc., specifically described in the embodiment.

[1] A cable (1), comprising: a plurality of electric wires (first electric wires (2) and second electric wires (3)); a paper tape (6) wound around the plurality of electric wires; and outer covering (7) that covers a periphery of the paper tape (6) and comprises a urethane-based resin, wherein an air resistance of the paper tape (6) as measured by the Gurley tester method is not less than 5.0 sec/100 cc.

[2] The cable (1) defined by [1], wherein the air resistance of the paper tape (6) as measured by the Gurley tester method is not more than 30.0 sec/100 cc.

[3] The cable (1) defined by [1] or [2], wherein the plurality of electric wires comprise a pair of first electric wires (2) and a twisted pair wire (4) formed by twisting a pair of second electric wires (3) having a smaller outer diameter than the first electric wires (2), the paper tape (6) is spirally wound around an assembled article (5) that is formed by twisting the pair of first electric wires (2) and the twisted pair wire (4) together, and a twist direction of the twisted pair wire (4) is different from a twist direction of the assembled article (5) and the twist direction of the assembled article (5) is different from a winding direction of the paper tape (6).

[4] The cable (1) defined by [3], wherein a twist pitch of the twisted pair wire (4) is smaller than a twist pitch of the assembled article (5), and a winding pitch of the paper tape (6) is smaller than the twist pitch of the assembled article (5) and is not less than the twist pitch of the twisted pair wire (4).

[5] The cable (1) defined by [3] or [4], wherein the first electric wire (2) comprises a power line for supplying a drive current to a motor (101a) for an electric parking brake (101) mounted on a wheel (102) of a vehicle (100).

[6] The cable (1) defined by any one of [3] to [5], wherein the second electric wire (3) comprises a signal line for a sensor mounted on a wheel (102) of a vehicle (100).

[7] The cable (1) defined by any one of [3] to [6], wherein the assembled article (5) comprises a plurality of thread-shaped fillers arranged between the pair of first electric wires (2)/the twisted pair wire (4) and the paper tape (6), the plurality of fillers are twisted together with the pair of first electric wires (2) and the twisted pair wire (4), and a twist direction of the plurality of fillers is the same as the twist direction of the assembled article (5) and is different from the winding direction of the paper tape (6).

[8] A wire harness (10), comprising: the cable (1) defined by any one of [3] to [7]; and a connector attached to at least one of end portions of the first electric wires (2) and of the second electric wires (3).

Although the embodiment of the invention has been described, the invention according to claims is not to be limited to the embodiment described above. Further, please note that all combinations of the features described in the embodiment are not necessary to solve the problem of the invention.

The invention can be appropriately modified and implemented without departing from the gist thereof.

What is claimed is:

1. A cable, comprising:
   a plurality of electric wires;
   a paper tape wound around the plurality of electric wires; and
   an outer covering that covers a periphery of the paper tape and comprises a urethane-based resin,
   wherein an air resistance of the paper tape as measured by Gurley tester method is not less than 5.0 sec/100 cc, and
   wherein the air resistance of the paper tape as measured by the Gurley tester method is not more than 30.0 sec/100 cc.

2. The cable according to claim 1, wherein the plurality of electric wires comprise a pair of first electric wires and a twisted pair wire formed by twisting a pair of second electric wires having a smaller outer diameter than the first electric wires, wherein the paper tape is spirally wound around an assembled article that is formed by twisting the pair of first electric wires and the twisted pair wire together, and wherein a twist direction of the twisted pair wire is different from a twist direction of the assembled article and the twist direction of the assembled article is different from a winding direction of the paper tape.

3. The cable according to claim 2, wherein a twist pitch of the twisted pair wire is smaller than a twist pitch of the assembled article, and wherein a winding pitch of the paper tape is smaller than the twist pitch of the assembled article and is not less than the twist pitch of the twisted pair wire.

4. The cable according to claim 2, wherein the first electric wire comprises a power line for supplying a drive current to a motor for an electric parking brake mounted on a wheel of a vehicle.

5. The cable according to claim 2, wherein the second electric wire comprises a signal line for a sensor mounted on a wheel of a vehicle.

6. The cable according to claim 2, wherein the assembled article comprises a plurality of thread-shaped fillers arranged between the pair of first electric wires/the twisted pair wire and the paper tape, wherein the plurality of fillers are twisted together with the pair of first electric wires and the twisted pair wire, and wherein a twist direction of the plurality of fillers is the same as the twist direction of the assembled article and is different from the winding direction of the paper tape.

7. A wire harness, comprising: the cable according to claim 2; and a connector attached to at least one of end portions of the first electric wires and of the second electric wires.

8. The cable according to claim 1, wherein the plurality of electric wires comprise a pair of first electric wires and a twisted pair wire formed by twisting a pair of second electric wires having a smaller outer diameter than the first electric wires, wherein the paper tape is spirally wound around an assembled article that is formed by twisting the pair of first electric wires and the twisted pair wire together, and wherein a twist direction of the twisted pair wire is different from a twist direction of the assembled article and the twist direction of the assembled article is different from a winding direction of the paper tape.

9. The cable according to claim 3, wherein the first electric wire comprises a power line for supplying a drive current to a motor for an electric parking brake mounted on a wheel of a vehicle.

10. The cable according to claim 3, wherein the second electric wire comprises a signal line for a sensor mounted on a wheel of a vehicle.

11. The cable according to claim 4, wherein the second electric wire comprises a signal line for a sensor mounted on a wheel of a vehicle.

12. The cable according to claim 3, wherein the assembled article comprises a plurality of thread-shaped fillers arranged between the pair of first electric wires/the twisted pair wire and the paper tape, wherein the plurality of fillers are twisted together with the pair of first electric wires and the twisted pair wire, and wherein a twist direction of the plurality of fillers is the same as the twist direction of the assembled article and is different from the winding direction of the paper tape.

13. The cable according to claim 4, wherein the assembled article comprises a plurality of thread-shaped fillers arranged between the pair of first electric wires/the twisted pair wire and the paper tape, wherein the plurality of fillers are twisted together with the pair of first electric wires and the twisted pair wire, and wherein a twist direction of the plurality of fillers is the same as the twist direction of the assembled article and is different from the winding direction of the paper tape.

14. The cable according to claim 5, wherein the assembled article comprises a plurality of thread-shaped fillers arranged between the pair of first electric wires/the twisted pair wire and the paper tape, wherein the plurality of fillers are twisted together with the pair of first electric wires and the twisted pair wire, and wherein a twist direction of the plurality of fillers is the same as the twist direction of the assembled article and is different from the winding direction of the paper tape.

15. A wire harness, comprising: the cable according to claim 3; and a connector attached to at least one of end portions of the first electric wires and of the second electric wires.

16. A wire harness, comprising: the cable according to claim 4; and a connector attached to at least one of end portions of the first electric wires and of the second electric wires.

17. A wire harness, comprising: the cable according to claim 5; and a connector attached to at least one of end portions of the first electric wires and of the second electric wires.

18. A wire harness, comprising: the cable according to claim 6; and a connector attached to at least one of end portions of the first electric wires and of the second electric wires.

\* \* \* \* \*